July 23, 1940.  E. H. TAYLOR  2,208,821
FITTING
Filed July 17, 1939
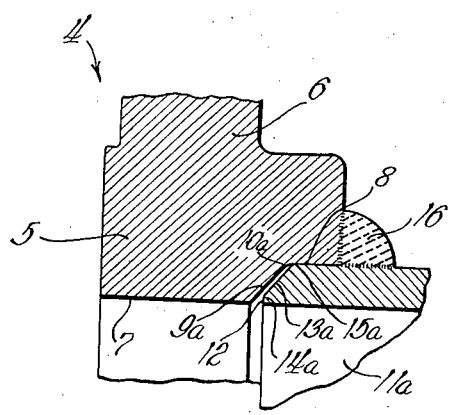
Inventor:
Edward Hall Taylor
By Brown, Jackson, Boettcher & Dienner
Attys.

Patented July 23, 1940

2,208,821

UNITED STATES PATENT OFFICE 2,208,821

FITTING

Edward Hall Taylor, Oak Park, Ill.

Application July 17, 1939, Serial No. 284,836

1 Claim. (Cl. 285—111)

This invention relates to fittings intended for use with pipes, and has to do with fittings to be welded to pipe ends.

The instant invention is directed primarily to the provision of a bolting flange or analogous fitting for welding to a pipe, such fitting being so constructed as to permit expansion and contraction of the end of the pipe, during and subsequent to the welding operation, in such manner as to reduce or eliminate objectionable stresses and assure a continuous and unbroken line of weld of maximum mechanical strength. More specifically, I provide a bolting flange or analogous article suitable for welding to a beveled pipe end, the latter and the flange or fitting having cooperating surfaces which facilitate proper positioning of the flange on the pipe end, while causing radial compression of the latter, during the welding operation, in amount sufficient to accommodate lengthwise expansion of the pipe end, due to heating thereof during the welding operation, thereby avoiding breaking of the weld, in whole or in part. That renders it possible to weld the fitting to the pipe end with expedition and facility while avoiding breakage of the weld line due to stresses caused by expansion and contraction of the end of the pipe. Further objects and advantages of my invention will appear from the detail description.

The single figure of the drawing is a fragmentary axial sectional view, partly broken away, through a bolting flange embodying my invention and the end portion of a pipe welded to the bolting flange.

I provide a bolting flange 4 comprising a body portion 5 and an annular flange 6. Body portion 5 is provided with a central bore 7, extending from one end thereof, and with a second bore 8 extending from the other end of the body concentric with and of greater diameter than bore 7, the inner end of bore 8 terminating short of the inner end of bore 7. The inner ends of the bores 7 and 8 are connected by a seat member comprising a flat inclined surface 9a extending to the inner end of bore 7 at an inward inclination thereto, and a fillet element defining a curved surface 10a curved on an arc outward of body 5 and connecting and tangent to the outer end of surface 9a and the inner end of bore 8. The annular recess provided by bore 8 receives the end portion of a pipe member 11a. The end of pipe 11a which extends into body 5 of the bolting flange may be beveled in a known manner such as is used in connection with pipe ends which are to be welded together. It is provided with a relatively narrow flat surface 12 extending in a plane radial to the end of the pipe, and with a relatively wide flat surface 13a extending from the outer edge of surface 12 to the outer circumference of pipe member 11a, the angle of surface 13a to the horizontal being substantially the same as the angle of surface 9a to the horizontal. Surfaces 12 and 13a define, at the juncture thereof, an inner abutment 14a extending circumferentially about the inner end of the pipe, and surface 13a defines, with the outer circumferential surface of the pipe, an outer abutment 15a extending circumferentially about the pipe. The bolting flange 4 is placed upon the end of the pipe and welded thereto, about the outer end of bore 8, by means of weld metal 16.

The flat inclined surface 9a and curved surface 10a, of the seat element, and surface 13a and abutments 14a and 15a, of pipe 11a, are so related that abutment 14a is spaced an appreciable distance from surface 9a and abutment 15a is in contact with curved surface 10a, when pipe 11a is cold. Upon heating of the pipe end, incident to the welding operation, with consequent endwise expansion thereof, abutment 15a rides along curved surface 10a causing radial compression of the pipe end, sufficient to accommodate the lengthwise expansion thereof and thus avoid subjecting the weld joint to objectionably high stresses. Ordinarily, the endwise expansion of the pipe end is not sufficient to bring abutment 14a into contact with surface 9a. That may occur in some cases, however, and abutment 14a will then ride along surface 9a, supplementing the action of abutment 15a in radially compressing the pipe end. The form of bolting flange disclosed herein is suitable for use with pipe of medium or light weight, though it may be used to advantage with heavier pipe.

I claim:

A bolting flange for welding to a pipe end, said flange comprising a body and a flange element extending radially outward from said body, the latter having a cylindrical bore extending from one end and being provided at that end with a seating surface extending radially outward from said bore, said body being provided with a second cylindrical bore extending from its other end concentric with and of greater diameter than said first bore and defined by a surface parallel with the common axis of said bores, the latter being spaced apart axially and the inner end of said first bore being connected to the inner end of said second bore by a surface inclined outward toward said second bore and a fillet defining a surface curved on a relatively short radius outward of said body tangent at its ends to said inclined surface and said surface of said second bore, the latter being adapted to receive the end portion of a pipe of corresponding exterior diameter having its end beveled from its outer surface at an inclination substantially the same as that of said inclined surface, said curved fillet surface being so related to said surfaces tangent thereto as to dispose the area of the pipe at the outer end of said bevel thereof in contact with said fillet surface and space the bevel of said pipe end from said inclined surface a proper distance to accommodate normal expansion of said pipe incident to welding thereof to said body, said fillet being effective for causing radial compression of the pipe end during normal expansion of the pipe and the inclination of said inclined surface being such as to be effective for cooperating with the bevel of the pipe end and supplementing the action of the fillet in causing radial compression of the pipe end upon abnormal expansion of said pipe.

EDWARD HALL TAYLOR.